United States Patent Office 3,637,751
Patented Jan. 25, 1972

3,637,751
PRODUCTION OF TRIOXANE
Hugo Fuchs and Heinrich Sperber, Ludwigshafen, Germany, assignors to Badische Anilin- & Soda-Fabrik Aktiengesellschaft, Ludwigshafen (Rhine), Germany
No Drawing. Filed Apr. 15, 1970, Ser. No. 28,958
Claims priority, application Germany, Apr. 17, 1969,
P 19 19 495.7
Int. Cl. C07d 19/00
U.S. Cl. 260—340                                    1 Claim

ABSTRACT OF THE DISCLOSURE

Manufacture of trioxane from formaldehyde with the aid of an acid catalyst in the presence of an oily phase which is capable of preventing the separation of paraformaldehyde and which consists of a phthalic ester.

---

It is known to produce trioxane from concentrated aqueous formaldehyde solutions in the presence of acid catalysts. The catalyst concentration is, for example, from about 0.1 to about 10% by weight of the reaction mixture when sulfuric acid is used as catalyst. At lower catalyst concentrations the rate of formation of the trioxane falls steeply, whilst at concentrations above 10% by weight there is a sharp increase in the formation of by-products, i.e. formic acid, methyl formate, methylal, etc.

It has also been proposed to use acid ion exchangers as catalysts. In such cases, however, the rate of formation of the trioxane is reduced compared with that obtained when using dissolved mineral acids.

Thus, to achieve high conversion rates, it is necessary to keep the concentration of formaldehyde and also that of the catalytic acid as high as possible.

A big drawback involved in carrying out these measures is that after a relatively short period clouding of the reaction mixture occurs as a result of a side reaction and eventually paraformaldehyde separates out, this tendency being particularly marked where the concentration of formaldehyde in the reaction mixture is more than 65% by weight. The U.S. Pat. No. 3,149,127 recommends the addition of methanol as a means of preventing the deposition of paraformaldehyde. On the other hand it is preferred to use a formaldehyde which is substantially free from reactive added matter in order to avoid the formation of by-products.

Thus trioxane synthesis has been carried out in the presence of liquid paraffin, which does not dissolve in the reaction mixture containing formaldehyde under the conditions of reaction, and this has been fairly successful in preventing paraformaldehyde separation (U.S. Pat. No. 3,310,572).

However, in this method trouble is caused after a certain period of operation by the occurrence of foaming, which even with the addition of antifoaming agents is difficult to prevent and in some cases cannot even be reduced.

We have now found, surprisingly, that trioxane may be advantageously produced by distilling an aqueous formaldehyde solution under the action of an acid catalyst and in the presence of an oily phase, provided the oily phase consists of a diester of o-phthalic acid with a monohydric alcohol containing from 3 to 20 carbon atoms.

Suitable acid catalysts are those normally used in the manufacture of trioxane, such as sulfuric acid, phosphoric acid or polyphosphoric acid in concentrations of from 0.1 to 30% and preferably from 0.1 to 10% by weight, although concentrations above 30% may be used in the case of weak acids such as phosphoric and polyphosphoric acids. Suitable diesters of o-phthalic acid are, for example, diesters with isobutanol, butyl alcohol, benzyl alcohol and octyl alcohol, such as diisobutyl phthalate, butyl benzyl phthalate and, preferably, di-(2-ethylhexyl)phthalate. Such diesters of phthalic acid are well known from the chemistry of plasticizers for, say, polyvinyl chloride and are readily available. The amounts of diester used may be from, for example, 5 to 70% by weight of the reaction mixture, and preferably from 40 to 60% by weight. The most suitable amount is apparently governed, in general, by the shape of the apparatus used for the reaction.

Suitable reaction apparatus includes continuously operated stirred boilers having a fractionating column connected thereto, circulation evaporators and similar equipment. The reaction conditions are those normally employed in trioxane synthesis and are described in the relevant patent specifications, particularly those cited above.

The most surprising and unexpected feature of our process is that the diesters of phthalic acid are not appreciably attacked under the conditions of reaction by the acid used, not even when the acid concentration of the reaction mixture is high (for example from 2 to 30% of sulfuric acid by weight of the formaldehyde/water phase).

The process of the invention has the advantage that hardly any paraformaldehyde is formed in the reaction mixture during periods of continuous operation of several weeks. Moreover, the formation of by-products, such as methylal, formic acid or methyl formate, as is usual in previous processes, is unexpectedly less in the process of the invention than in a process known in the art at equal sulfuric acid concentrations.

If, for some reason, the reaction mixture has to be renewed, it is found that the oily phase containing the diester does not emulsify but can be readily separated from the aqueous phase. The diester may be washed with water and reused in the synthesis.

The process is conveniently carried out approximately as follows:

A 50-70% aqueous formaldehyde solution is continuously fed to, say, a circulation evaporator. The reaction mixture at the base contains, for example, 50% of di-(2-ethylhexyl)phthalate and 12% of sulfuric acid by weight of the aqueous phase.

If desired, a small fractionating column may be fitted on top of the reactor and a portion of the reaction mixture, in which the reaction has proceeded to completion, may be fed to the top of the column and allowed to flow down counter-currently to the rising mixture of vapors.

The synthesis vapors are conveniently rectified in a fractionating column and the formaldehyde solution obtained will then be recycled to the synthesis either directly or following a concentration treatment, depending on its concentration.

The condensed synthesis vapors may be conveniently worked up by usual methods, such as extracting the trioxane, washing the extract with alkali, separating the solvent and purifying the trioxane by distillation. It is possible and advantageous to recycle portions of the bottoms from the solvent distillation and the bottoms from the purification by distillation and also portions of the first rannings from the purification by distillation, which contain small quantites of dioxymethylene dimethyl ether, trioxymethylene dimethyl ether and tetroxane as impurities, to the reactor, where they are split into methanol and formaldehyde in the presence of the acid catalyst, which formaldehyde is again available for trioxane synthesis.

Due to the addition of phthalic acid diesters in accordance with the present invention it is possible to maintain higher catalyst concentrations in the reactor without increases in the formation of by-products. The precipitation of paraformaldehyde in the reaction mixture is prevented and no undesirable foaming occurs. The yields are above 95% of theory on converted formaldehyde.

EXAMPLE 1

In a circulation reactor having an evaporator capacity of 15 liters there are placed 5,000 g. of di-(2-ethylhexyl) phthalate. To this there are added 5,000 g. of 60% formaldehyde solution and 750 g. of concentrated sulfuric acid. The reaction mixture boils at about 100° C. The mixture of vapors which are given off is subjected to rectification in the usual manner with recovery of the formaldehyde distilled off.

In continuous operation of this plant, 10,000 g. of 60% formaldehyde solution are fed to the reactor per hour. The heat applied to the reactor is adjusted such that 10,000 g. of distillate are obtained per hour, with the result that the amount of material contained in the reactor remains constant. The average residence time of the formaldehyde is thus 30 minutes.

The analysis of the synthesis vapor leaving the reactor provides the following values: trioxane 20.1%; water 39.3%; formaldehyde 39.6%; formic acid 0.7%; other components 0.3%. The overall yield based on formaldehyde is 98.5% of theory.

The once-through conversion of formaldehyde is 33.4% based on the amounts of formaldehyde fed in and distilled off.

The plant may be kept in continuous operation for at least 6 weeks without any trouble occurring due to paraformaldehyde separation or foaming.

EXAMPLE 2

The process is carried out as described in Example 1. 6,000 g. of diisobutyl phthalate, 4,000 g. of 60% formaldehyde solution and 400 g. of concentrated sulfuric acid are placed in a circulation reactor and heated at 100° C. The plant is maintained in continuous operation for at least 4 weeks, during which 8,000 g. of 60% formaldehyde are fed to the reactor per hour and 8,000 g./hr. of distillate are recovered.

In the analysis of the synthesis vapors directly leaving the reactor the following values are found: trioxane 18.7%; water 39.5%; formaldehyde 40.6%; formic acid 0.7%; remainder 0.5%.

The yield on converted formaldehyde is 96.8% and the conversion is 31.3%.

COMPARATIVE EXPERIMENT A 10,000 g. of 60% w./w. formaldehyde solution and 1,000 g. of concentrated sulfuric acid are placed in a circulation reactor having a working capacity of 15 liters and are heated at 100° C. The heat is applied at such a rate that 20,000 g./hr. of distillate are produced. Concurrently therewith there are fed 20,00 g./hr. of 60% formaldehyde solution to the reactor.

The distillate has the following composition: trioxane 18.3%; formaldehyde 40.4%; water 38.7%; formic acid 1.5%; remainder 1.0%. The conversion is found to be 30.5%.

The overall yield based on formaldehyde is 94.0%.

The reaction solution becomes cloudy due to paraformaldehyde separation after only 24 hours, and after 300 hours it is necessary to stop the process, as the heat transfer in the reaction chamber is considerably impaired.

COMPARATIVE EXPERIMENT B

This experiment is carried out as described in Example 1. In the circulation evaporator there are placed 5,000 g. of liquid paraffin and 5,000 g. of 60% formaldehyde solution together with 750 g. of concentrated sulfuric acid. The reaction mixture is heated such that 10,000 g./hr. of distillate are produced. Concurrently there is fed a corresponding quantity of 60% formaldehyde to the reactor. After a period of 2 days it is necessary to terminate the process, as the amount of foam produced under the stated conditions prevents trouble-free rotation.

We claim:

1. A process for the manufacture of trioxane by the distillation of an aqueous formaldehyde solution under the action of an acid catalyst and in the presence of an oily phase, wherein the oily phase is a diester of o-phthalic acid with a monohydric alcohol containing from 3 to 20 carbon atoms.

No references cited.

NORMA S. MILESTONE, Primary Examiner

U.S. Cl. X.R.

260—340